(12) United States Patent
Ahmad et al.

(10) Patent No.: US 10,927,675 B2
(45) Date of Patent: Feb. 23, 2021

(54) METHOD FOR MAINTAINING A TURBOMACHINE

(71) Applicant: SIEMENS AKTIENGESELLSCHAFT, München (DE)

(72) Inventors: Fathi Ahmad, Kaarst (DE); Matthias Kuhlee, Mülheim an der Ruhr (DE); Radan Radulovic, Bochum (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 16/610,550

(22) PCT Filed: Apr. 26, 2018

(86) PCT No.: PCT/EP2018/060758
§ 371 (c)(1),
(2) Date: Nov. 4, 2019

(87) PCT Pub. No.: WO2018/206306
PCT Pub. Date: Nov. 15, 2018

(65) Prior Publication Data
US 2020/0056481 A1     Feb. 20, 2020

(30) Foreign Application Priority Data

May 8, 2017   (DE) ..................... 10 2017 207 667.4

(51) Int. Cl.
*F01D 5/00*      (2006.01)
*B23P 6/00*      (2006.01)

(52) U.S. Cl.
CPC .............. *F01D 5/005* (2013.01); *B23P 6/005* (2013.01); *F05D 2230/80* (2013.01)

(58) Field of Classification Search
CPC ........ F01D 5/005; F01D 25/246; B23P 6/005; B23P 6/007; F05D 2230/80;
(Continued)

(56) References Cited

U.S. PATENT DOCUMENTS 6,173,491 B1   1/2001   Goodwater et al.
6,394,750 B1   5/2002   Hiskes
(Continued)

FOREIGN PATENT DOCUMENTS

| DE | 10 2015 200 405 A1 | 7/2016 |
| DE | 102015200405 A1 | 7/2016 |
| EP | 1268981 A1 | 1/2003 |

OTHER PUBLICATIONS

PCT International Search Report dated Oct. 6, 2018 corresponding to PCT International Application No. PCT/EP2017/065493 filed Aug. 2, 2018.

*Primary Examiner* — Lawrence Averick
(74) *Attorney, Agent, or Firm* — Schmeiser, Olsen & Watts LLP

(57) ABSTRACT

Provided is a method for maintaining an axial-flow turbomachine, which has a support structure and a plurality of axially adjacent guide vane rings each of which has a plurality of guide vanes, each guide vane having at least one platform, the platforms being fastened to the support structure by means of retaining elements, wherein facing platform end faces of axially adjacent guide vanes define sealing sections made of a metal material, the sealing sections being associated with each other and jointly forming a sealing assembly.

9 Claims, 5 Drawing Sheets

(58) Field of Classification Search
CPC ........... F05D 2250/294; F05D 2260/36; F05D 2260/31; F05D 2250/183
See application file for complete search history.

(56) References Cited

U.S. PATENT DOCUMENTS

| | | | | |
|---|---|---|---|---|
| 9,435,216 | B2* | 9/2016 | Stiehler | F01D 11/00 |
| 10,174,628 | B2* | 1/2019 | Humhauser | F01D 9/04 |
| 10,450,888 | B2* | 10/2019 | Wulf | F01D 9/042 |
| 10,533,569 | B2* | 1/2020 | Jakimov | F01D 11/001 |
| 2003/0012643 | A1 | 1/2003 | Tiemann | |
| 2007/0147991 | A1 | 6/2007 | Dasilva et al. | |
| 2015/0061228 | A1* | 3/2015 | Stiehler | F16J 15/3288 |
| | | | | 277/355 |
| 2016/0115966 | A1* | 4/2016 | Wulf | F01D 25/246 |
| | | | | 415/148 |
| 2016/0237855 | A1* | 8/2016 | Humhauser | F01D 11/001 |
| 2016/0377087 | A1* | 12/2016 | Jakimov | F16J 15/444 |
| | | | | 415/148 |
| 2017/0226887 | A1* | 8/2017 | Wulf | F01D 17/162 |

* cited by examiner

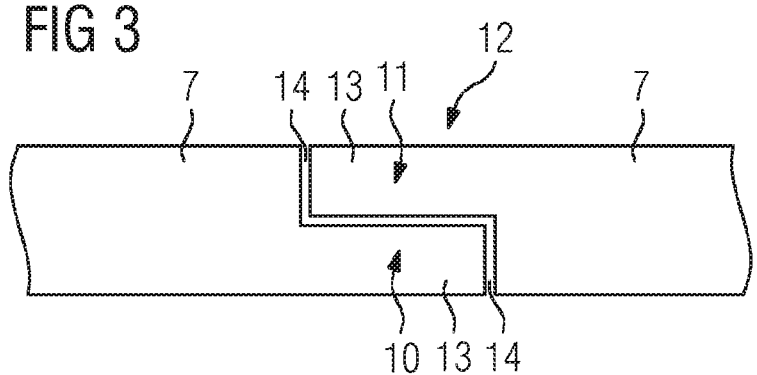
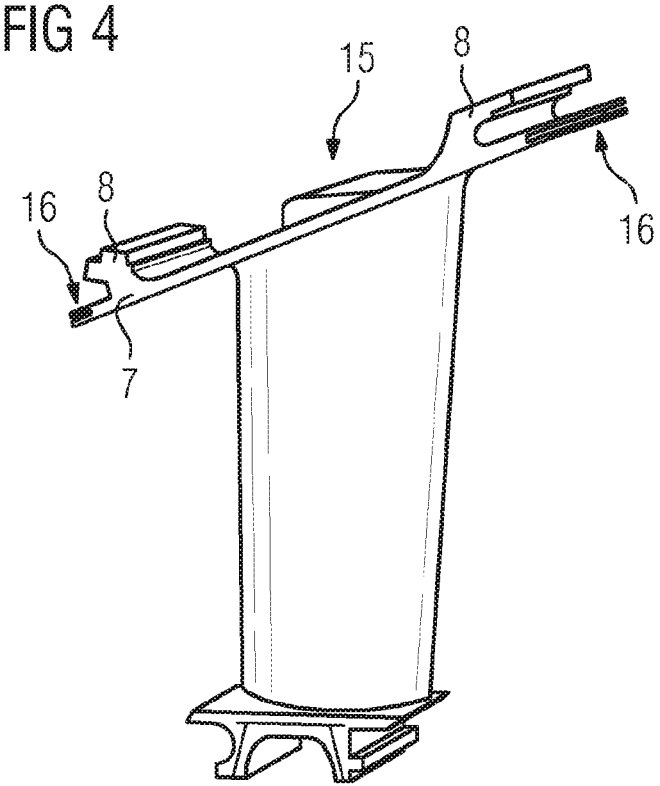

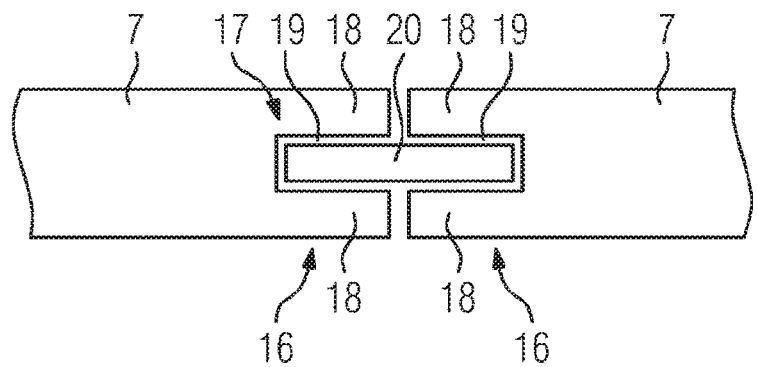
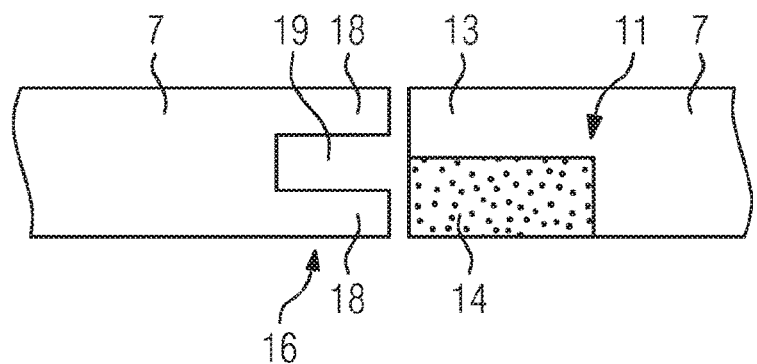
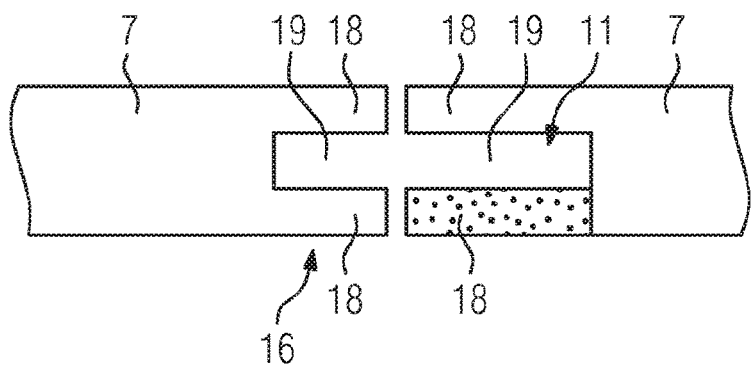
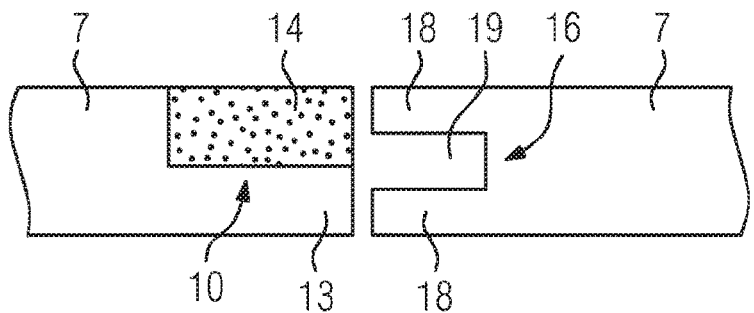

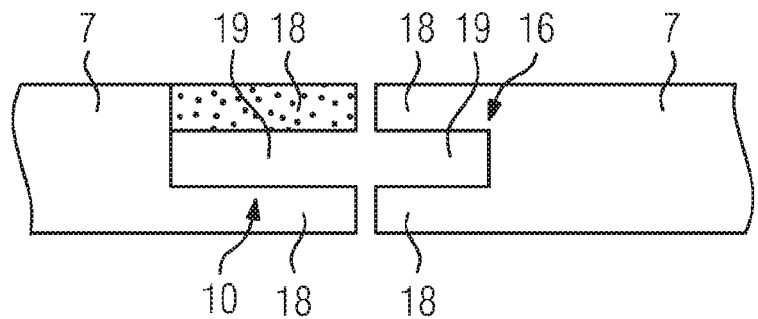
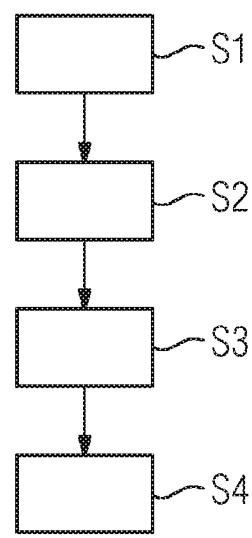

METHOD FOR MAINTAINING A TURBOMACHINE

CROSS-REFERENCE TO RELATED APPLICATIONS

This application claims priority to PCT Application No. PCT/EP2018/060758, having a filing date of Apr. 26, 2018, which is based on German Application No. 10 2017 207 667.4, having a filing date of May 8, 2017, the entire contents both of which are hereby incorporated by reference.

FIELD OF TECHNOLOGY

The following relates to a method for maintaining an axial-flow turbomachine, which has a support structure and a plurality of axially adjacent guide vane rings, each having a multiplicity of guide vanes, wherein the guide vanes are each provided with at least one platform, which is fastened to the support structure by means of retaining elements, wherein mutually facing platform end faces of axially adjacent guide vanes define mutually associated seal sections made of a metal material, which in each case jointly form a seal assembly.

BACKGROUND

Axial-flow turbomachines are known in many different embodiments in the known art, especially in the form of turbines. They comprise a plurality of axially adjacent guide vane rings, which direct a medium flowing through the turbomachine at a respective predetermined angle onto an associated rotor blade ring held downstream on a rotor.

Retaining elements, by means of which the guide vanes are fastened to the support structure, are formed on the lower sides of the platforms of the guide vanes. The support structure can be a casing of the turbomachine. As an alternative, however, a separate support structure surrounded by the casing can also be provided. To prevent the medium flowing through the turbomachine being able to leave the flow path, which is bounded radially on the outside by the platforms of the guide vanes, axially adjacent guide vanes are sealed off with respect to one another. For this purpose, the respectively facing end faces of axially adjacent guide vanes define mutually associated seal sections made of a metal material, which in each case jointly form a seal assembly. In an older design often employed by Siemens AG, the seal sections each have, for example, a projection which extends in the circumferential direction, projects axially and engages in an associated recess in the other seal section, the recess extending in the circumferential direction.

During the operation of a turbomachine, the components thereof wear. This applies especially also to the guide vanes which are exposed directly to the medium flowing through the turbomachine and to the temperature thereof. Defective guide vanes must be appropriately repaired or replaced by replacement guide vanes in the course of maintenance work. In the latter case, the guide vanes stocked are normally ones in which the design of the seal sections is identical to the design of the seal sections of the guide vanes installed in the turbomachine.

Among the measures taken to improve the efficiency of turbomachines is that of keeping down leakage losses. This leads to modification especially of the seal sections or the seal assemblies formed by the sections. Thus, there are turbomachines of various generations currently in use in which the guide vanes installed have fundamentally identical dimensions but differ from one another in respect of the design of their seal sections. This means that, purely because of differently designed seal sections, different guide vanes have to be stocked for older turbomachines than for more recent turbomachines even though the dimensions of the guide vanes are otherwise identical. As a result, the stocking of replacement guide vanes is associated with very high costs.

SUMMARY

An aspect relates to an alternative method of the type mentioned at the outset.

To achieve this aspect, embodiments of the present invention provides a method of the type mentioned at the outset comprising the following steps:

a) removal of a defective guide vane to be replaced and of at least one axially adjacent intact guide vane with which the guide vane to be replaced forms a seal assembly, wherein the seal sections forming this seal assembly each have a projection which extends in the circumferential direction, projects axially and engages in an associated recess in the other seal section, the recess extending in the circumferential direction;

b) making available a replacement guide vane replacing the removed defective guide vane, the platform of which replacement guide vane defines at least one replacement seal section made from a metal material, wherein the at least one replacement seal section comprises two axially projecting projections of equal length which extend in the circumferential direction and are separated from one another by a groove extending in the circumferential direction; and c) mounting the removed intact guide vane and the replacement guide vane on the support structure, wherein the seal section of the removed intact guide vane and the facing replacement seal section of the replacement guide vane are connected to one another by a sealing strip to form a functional seal assembly.

Accordingly, in the method according to embodiments of the invention, use is made of replacement guide vanes in which the design of the replacement seal sections does not correspond to the design of the seal sections of the guide vanes installed in the turbomachine but corresponds to a design of a new generation to produce a seal assembly with an improved sealing effect. The number of replacement guide vanes to be stocked can be correspondingly reduced, this being associated with a considerable cost reduction. As a compensatory measure, the corresponding seal sections of intact guide vanes which are axially adjacent to defective rotor blades are in each case attached to the associated replacement seal section of the replacement guide vane via a sealing strip to produce a functional seal assembly.

The sealing strip is produced from metal.

It is advantageous if at least one main surface of the sealing strip has a ridged surface, thereby making it possible to achieve an improved sealing effect.

According to one embodiment of the method according to the invention, the sealing strip is fastened by means of a plurality of fastening means at least to the seal section of the removed intact guide vane in order to ensure reliable and permanent positioning of the sealing strip, wherein, in particular, the fastening means are rivets.

According to one variant of the method according to embodiments of the invention, the seal section of the removed intact guide vane is machined in such a way before mounting in step c) that, in a manner corresponding to the replacement seal section, it has two projections which extend in the circumferential direction, project axially and are separated from one another by a groove extending in the circumferential direction. In other words, the design of the seal section of the removed intact guide vane is converted to the design of the replacement seal section of a replacement guide vane by appropriate machining.

The machining of the seal section of the removed intact guide vane can be performed by closing the recess by the application of material and then introducing the groove. To close the recess, it is possible, in particular, to use a deposition welding or spraying method. An erosion method is used to form the groove.

As an alternative, the machining of the seal section of the removed intact guide vane can be performed by removing part of the seal section and fastening a replacement piece to the remaining part of the seal section, the piece defining the two projections and the groove.

BRIEF DESCRIPTION

Some of the embodiments will be described in detail, with reference to the following figures, wherein like designations denote like members, wherein:

FIG. 3 shows an enlarged view of the detail indicated by the reference sign III in FIG. 1, showing a seal assembly;

FIG. 4 shows a perspective view of a replacement guide vane;

FIG. 5 shows a view similar to FIG. 3, which shows a seal assembly formed between axially adjacent replacement guide vanes;

FIG. 6 shows a first view which shows the seal sections illustrated in FIG. 3 after the performance of individual machining steps;

FIG. 7 shows a second view which shows the seal sections illustrated in FIG. 3 after the performance of individual machining steps;

FIG. 8 shows a third view which shows the seal sections illustrated in FIG. 3 after the performance of individual machining steps;

FIG. 9 shows a fourth view which shows the seal sections illustrated in FIG. 3 after the performance of individual machining steps;

FIG. 10 shows a flow diagram which schematically shows individual steps of a maintenance method according to one embodiment of the present invention;

DETAILED DESCRIPTION

Figure 1:
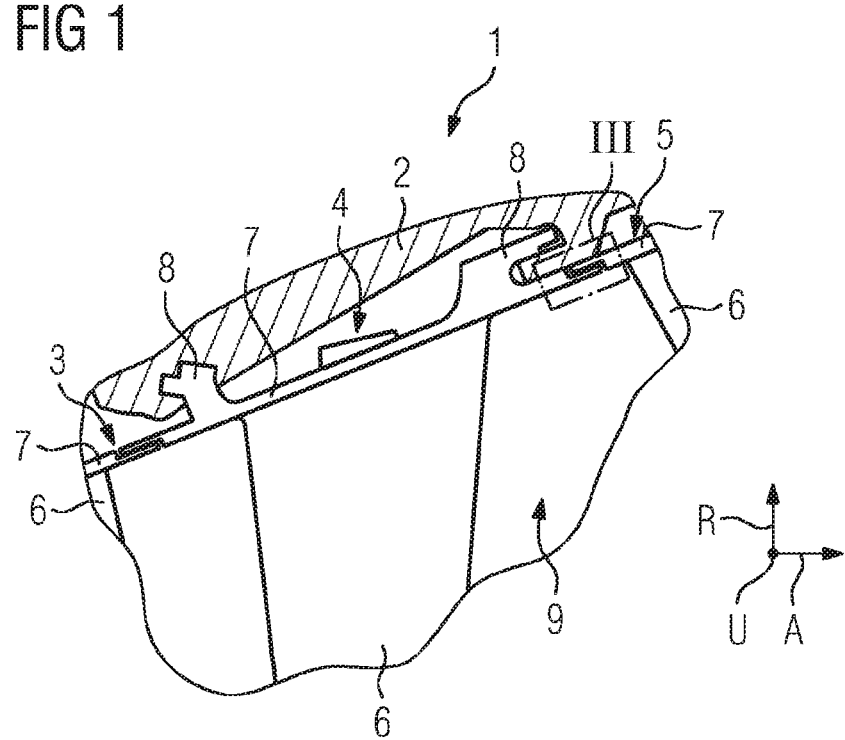
FIG. 1 shows a sectioned partial view of a turbomachine according to one embodiment of the present invention.
Figure 2:
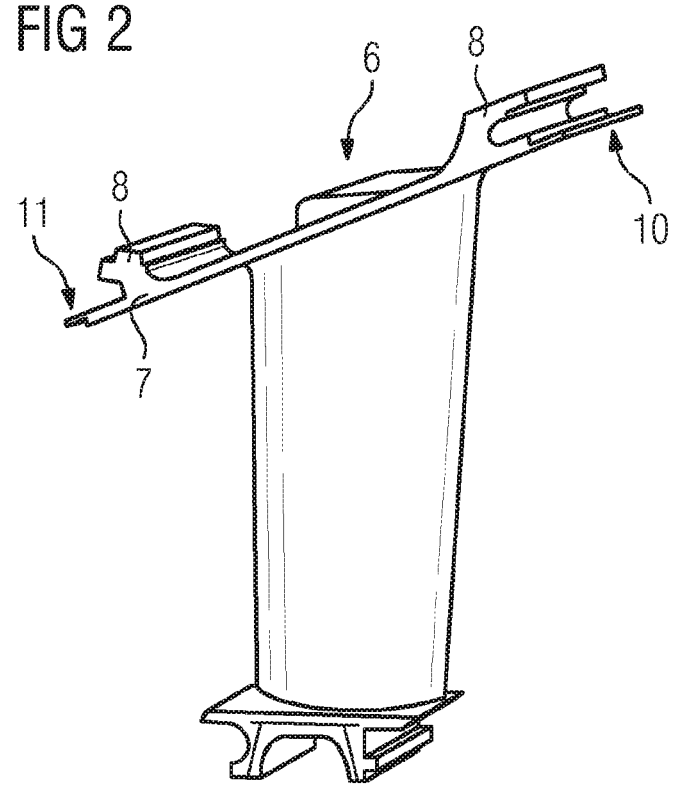
FIG. 2 shows a perspective view of a guide vane of the turbomachine shown in FIG. 1.

FIG. 1 shows a detail of an axial-flow turbomachine 1, which has a support structure 2 and a plurality of axially adjacent guide vane rings 3, 4, 5, each having a multiplicity of guide vanes 6. The guide vanes 6 are provided with radially outer platforms 7, which are fastened to the support structure 2 via retaining elements 8 and jointly define a radially outer boundary of an annular flow duct 9 of the turbomachine 1. In order to prevent a medium flowing through the flow duct 9 in the axial direction A from escaping through gaps present between axially adjacent guide vanes 6, the respectively facing platform end faces of axially adjacent guide vanes 6 define mutually associated seal sections 10 and 11 made of a metal material, which in each case jointly form a seal assembly 12. To be more precise, the seal sections 10 and 11 in the present case have an old design, each having a single projection 13 in the form of a ring segment which extends in the circumferential direction U, projects axially and engages in an associated recess 14 in the form of a ring segment in the axially opposite seal section, the recess extending in the circumferential direction U. In a corresponding fashion, a seal assembly 12 in the form of a simple region of overlap is formed, which prevents the fluid flowing through the flow duct 9 from being able to pass readily through the interspace between the platforms 7 of axially adjacent guide vanes 6, thereby keeping leakage losses low.

FIG. 4 shows a replacement guide vane 15 according to one embodiment of the present invention. The replacement guide vane 15 has substantially identical dimensions relative to the previously described guide vane 6. It differs only as regards the design of its seal sections 16, which are referred to below as replacement seal sections, and as regards the seal assembly 17 formed by the replacement sections 16. In the present case, the mutually axially opposite replacement seal sections 16 of a platform 7 of the replacement guide vane 15 are of identical design and comprise a new design improved in relation to the seal sections 10 and 11 of the guide vanes 6 and in each case having two projections 18 in the form of ring segments which extend in the circumferential direction U, project axially and are separated from one another by a groove 19 extending in the circumferential direction U. To form the improved seal assembly 17 illustrated in FIG. 5, a sealing strip 20 is inserted between the replacement seal sections 16 of axially adjacent replacement guide vanes 15, the sealing strip in each case engaging in the mutually axially opposite grooves 19 of the replacement seal sections 16, see especially FIG. 5.

If one guide vane 6 of the turbomachine 1 is defective, it is removed in accordance with a maintenance method according to one embodiment of the present invention in a first step S1, see FIG. 10. Moreover, at least one axially adjacent intact guide vane 6, with which the defective guide vane to be replaced forms a seal assembly 12, is removed.

In a subsequent step S2, a replacement guide vane 15 is made available, the guide vane being intended to replace the removed defective guide vane 6.

Owing to the fact that the old design of the seal sections 10 and 11 of the still intact guide vanes 6 differs from the new design of the replacement seal sections 16 of the replacement guide vane 15, immediate installation of the replacement guide vane 15 is not possible since it is not possible to produce a functional seal assembly. According to a first variant of the method according to embodiments of the invention, that seal section 10 or 11 of the removed intact guide vane 6 which will face the replacement guide vane 15 in the installed state is accordingly subjected in step S3 to machining. For this purpose, the recess 14 in the corresponding seal section 10 or 11, as illustrated in FIGS. 6 and 8, is closed in a first step with the application of material, for which purpose a deposition welding or spraying method can be used, for example. In a further step, a groove 19 is introduced at the end using an erosion method, thereby simultaneously producing projections 18, cf. FIGS. 7 and 9. A design similar to the replacement seal section 16 is thereby created.

In a further step S4, the machined intact guide vane 6 and the replacement guide vane 15 are mounted in the support structure 2, forming a functional seal assembly 17 on the support structure 2 of the turbomachine 1, for which purpose a metal sealing strip 20 is inserted into the mutually opposite grooves 19 similarly to FIG. 5, the length of which corresponds approximately to the length of the replacement seal section 16 in the circumferential direction U. In this way, a labyrinth-type seal with a sealing effect better than the seal assembly 12 is achieved.

It should be clear that, if a defective guide vane 6 has two axially directly adjacent intact guide vanes 6, both intact guide vanes 6 are removed in step S1, machined in step S3 and mounted in step S4 to form a functional seal assembly 17 of newer design.

One significant advantage of the method described above is that, to maintain the turbomachine 1, it is only necessary to stock replacement guide vanes 15, the replacement seal sections 16 of which have a newer and improved design relative to the seal sections 10 and 11 of the guide vanes 6. In contrast, it is not necessary to stock guide vanes 6, the seal sections 10, 11 of which have the old design. A further advantage is that, when replacing defective guide vanes 6, old seal assemblies 12 are simultaneously replaced by new seal assemblies 17, thereby further reducing leakage losses, this being associated with an increase in the power of the turbomachine 1.

Figure 11:
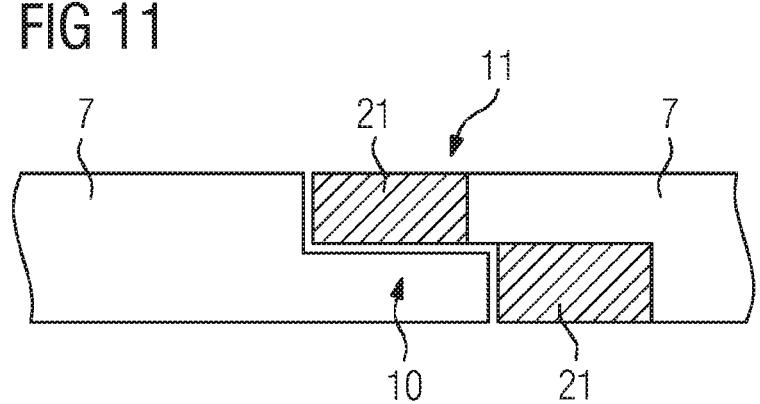
FIG. 11 shows a first view which shows alternative machining of a seal section illustrated in FIG. 3.
Figure 12:
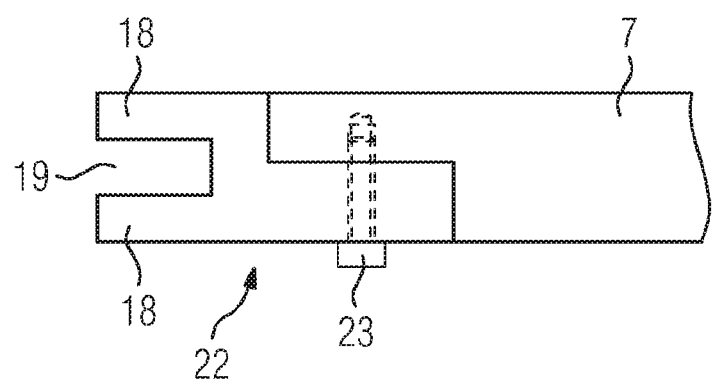
FIG. 12 shows a second view which shows alternative machining of a seal section illustrated in FIG. 3.

FIGS. 11 and 12 show alternative machining of a seal section 11 of a removed and intact guide vane 6 in step S3. Here, the regions 21 indicated by hatching in FIG. 11 are first of all removed, e.g. in the course of a milling operation, whereupon an additional part 22 defining the projections 18 and the groove 19 is fastened to the remaining part of the seal section 11, in the present case by using fastening screws 23.

Figure 13:
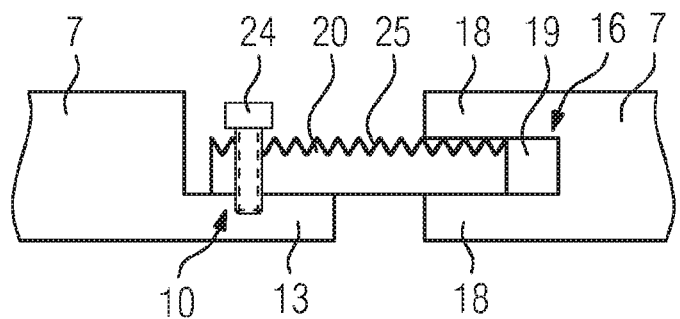
FIG. 13 shows a view which shows another embodiment of the method according to embodiments of the invention.

FIG. 13 shows a variant of the method according to embodiments of the invention, in which the step S3 illustrated in FIG. 10 can be completely omitted. In this variant, the gap between a seal section 10, 11 of old design of a removed intact guide vane 6 and a replacement seal section 16 of a replacement guide vane 15 is sealed in step S4 by a sealing strip 20, which is fastened to the seal section 10, 11 with fastening means 24, wherein the fastening means 24 can be rivets, to mention just one example. At least one main surface of the sealing strip 20 can be provided with a ridged surface 25, in particular the main surface facing away from the flow duct 9.

In particular, the seal sections 10 and 11 and the replacement seal sections 17 can have a different design as long as at least one seal section of a first, older, design of a still intact guide vane is adapted to a second, newer, design of a replacement seal section of a replacement guide vane as part of the maintenance method.

Although the present invention has been disclosed in the form of preferred embodiments and variations thereon, it will be understood that numerous additional modifications and variations could be made thereto without departing from the scope of the intention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for maintaining an axial-flow turbomachine, which has a support structure and a plurality of axially adjacent guide vane rings, each having a plurality of guide vanes, wherein the guide vanes are each provided with at least one platform, which is fastened to the support structure by means of retaining elements, wherein mutually facing platform end faces of axially adjacent guide vanes define mutually associated seal sections made of a metal material, which in each case jointly form a seal assembly, the method comprising:
   a) removing a defective guide vane to be replaced and at least one axially adjacent intact guide vane with which the guide vane to be replaced forms a seal assembly, wherein the seal sections forming the seal assembly each have a projection which extends in a circumferential direction, projects axially and engages in an associated recess in the other seal section, the recess extending in the circumferential direction;
   b) making available a replacement guide vane that is configured to replace the removed defective guide vane, the platform of which replacement guide vane defines at least one replacement seal section made from a metal material, wherein the at least one replacement seal section comprises two axially projecting projections of equal length which extend in the circumferential direction and are separated from one another by a groove extending in the circumferential direction; and
   c) mounting the removed intact guide vane and the replacement guide vane on the support structure, wherein the seal section of the removed intact guide vane and the facing replacement seal section of the replacement guide vane are connected to one another by a sealing strip to form a functional seal assembly.

2. The method as claimed in claim 1, wherein the sealing strip is produced from metal.

3. The method as claimed in claim 1, wherein at least one main surface of the sealing strip has a ridged surface.

4. The method as claimed in claim 1, wherein the sealing strip is fastened by means of a plurality of fastening means at least to the seal section of the removed intact guide vane, further wherein the fastening means are rivets.

5. The method as claimed in claim 1, wherein the seal section of the removed intact guide vane is machined in such a way before mounting in step c) that, in a manner corresponding to the replacement seal section, it has two projections which extend in the circumferential direction, project axially and are separated from one another by a groove extending in the circumferential direction.

6. The method as claimed in claim 5, wherein the machining of the seal section of the removed intact guide vane is performed in step c) by closing the recess by the application of material and then introducing the groove.

7. The method as claimed in claim 6, wherein a deposition welding or spraying method is used to close the recess.

8. The method as claimed in claim 6, wherein an erosion method is used to form the groove.

9. The method as claimed in claim 5, wherein the machining of the seal section of the removed intact guide vane is performed by removing part of the seal section and fastening a replacement piece to the remaining part of the seal section, the piece defining the two projections and the groove.

* * * * *